No. 735,149. Patented August 4, 1903.

UNITED STATES PATENT OFFICE.

ALEXANDER S. RAMAGE, OF CLEVELAND, OHIO.

PROCESS OF PRODUCING FOOD PRODUCTS.

SPECIFICATION forming part of Letters Patent No. 735,149, dated August 4, 1903.

Application filed May 27, 1903. Serial No. 159,021. (No specimens.)

*To all whom it may concern:*

Be it known that I, ALEXANDER S. RAMAGE, a citizen of the United States, residing at Cleveland, in the county of Cuyahoga and State of Ohio, have invented certain new and useful Improvements in Processes of Producing Food Products, of which the following is a specification.

This invention consists in a process of treating whey, to which may be added a certain amount of milk, to produce therefrom a food product containing the whey proteids, especially lactal bumin and lactoglobulin, without lactose.

In carrying out the process one thousand parts, by volume, of clear whey—for example, one thousand liters—are preferably rendered slightly alkaline with any suitable agent—for example, lime-water or sodium carbonate. The whey may then be concentrated, preferably *in vacuo* at a temperature between 60° and 64° centigrade, until the volume has been reduced to about three hundred liters. The concentrated whey is then allowed to cool, and about one hundred and fifty liters of pure alcohol is added. After the mixture stands for about one hour the whey proteids, especially lactal bumin and lactoglobulin, are precipitated. The solid products are then removed, washed with alcohol, and dried, preferably *in vacuo* at a temperature of 40° centigrade. The filtrate and washings are afterward distilled to recover the alcohol. The resulting food product, consisting of a mixture of the whey proteids without lactose, is soluble in water, is highly nourishing, and can be readily assimilated by invalids and children. The concentration of the whey before precipitation is not essential, but enables a smaller amount of alcohol to be employed.

For some purposes it is desirable to add a certain amount of milk, preferably skim-milk, to the whey before effecting the precipitation. For example, one part of skim-milk may be added to two parts of whey. The addition of an amount of alcohol sufficient to precipitate the proteids, but not the lactose, then gives a food product containing caseinogen and having a proteid content similar to that of mother's milk.

This application is specifically distinct from that filed by me January 27, 1902, Serial No. 91,417, in that it is limited to precipitation of the proteids without lactose.

I claim—

1. The process of producing a food product from whey, which consists in adding to the whey an amount of alcohol sufficient to precipitate the whey proteids but not the lactose, and separating and drying the precipitate, as set forth.

2. The process of producing a food product from whey, which consists in concentrating the whey, adding thereto an amount of alcohol sufficient to precipitate the whey proteids but not the lactose, and separating and drying the precipitate, as set forth.

3. The process of producing a food product from whey, which consists in rendering the whey slightly alkaline, concentrating it, adding an amount of alcohol sufficient to precipitate the whey proteids but not the lactose, and separating and drying the precipitate, as set forth.

4. The process of producing a food product, which consists in adding to a mixture of whey and milk an amount of alcohol sufficient to precipitate the proteids but not the lactose, and separating and drying the precipitate, as set forth.

In testimony whereof I affix my signature in presence of two witnesses.

ALEXANDER S. RAMAGE.

Witnesses:
ROB. C. LEES,
A. E. GILBERT.